May 3, 1966  G. B. ZWETZIG  3,249,756
SIMPLIFIED COUNTING AND GAGING CIRCUIT WITH DRIFT
EFFECT COMPENSATION
Filed Oct. 31, 1962

*INVENTOR.*
GERALD B. ZWETZIG
BY
ATTORNEY

United States Patent Office 3,249,756
Patented May 3, 1966

3,249,756
SIMPLIFIED COUNTING AND GAGING CIRCUIT WITH DRIFT EFFECT COMPENSATION
Gerald B. Zwetzig, Canoga Park, Calif., assignor to North American Aviation, Inc.
Filed Oct. 31, 1962, Ser. No. 234,451
3 Claims. (Cl. 250—83.3)

The present invention is directed to counting and gaging circuits and more particularly to nuclear counting rate meter circuits.

Most prior art counting circuits consists of a polarizing voltage, a radiation detector and a circuit, usually referred to as a counting rate meter circuit. This circuit usually incorporates a plurality of components for discriminating against pulses of a predetermined insufficient amplitude; the generation of a pulse of a standard size and shape in response to random-sized input pulses; the accumulation, usually through use of diodes, of the standard pulses into an integrator; and the amplification of the resulting voltage to preserve linearity and to obtain a useful current for operation of an indicating meter. The present invention eliminates many of the required components of these prior art circuits through the utilization of average electrical currents rather than pulses without sacrificing measurement accuracy. The result is that fewer electronic components are required with consequent increase in circuit reliability and substantial decrease in cost.

It is therefore the primary object of the present invention to provide a simplified count rate meter circuit which self-compensates for drift effects and which has improved reliability and decreased cost.

It is another object of the present invention to provide a simplified count rate meter circuit which is adaptable for use in a fixed or portable radiation thickness gage.

It is a further object of the present invention to provide a counting circuit which is adaptable for use as a counting rate meter in a fixed or portable radiation measurement instrument.

These and other objects and advantages of the present invention will be more apparent from the following description and the appended drawings, made a part hereof, in which.

The present invention is described with reference to a portable radiation survey instrument, e.g., a radiation thickness gage, for the purpose of illustrating the operation of the counting circuits of the present invention. However, many other applications and uses will be apparent to those skilled in the art.

Figure 1:
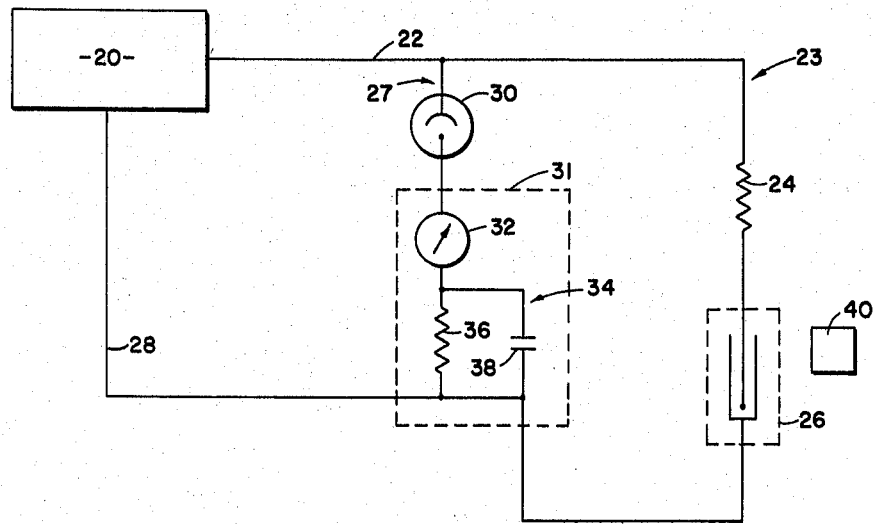
FIG. 1 is a circuit diagram of one embodiment of the present invention.

Referring now to the drawings in detail, FIG. 1 shows one circuit arrangement of the present invention and comprises a power supply 20 of standard design preferably having an output 22 of about 1000 volts at about 25 $\mu$a., for the particular application described. The output 22 is connected to the input of a first circuit 23 having a resistor 24 and a radiation detector 26 which is preferably a GM tube of standard design and response. The output 22 is also connected to the input of a second circuit 27, i.e., the input of a corona discharge voltage regulator tube 30. This tube has a characteristic operating voltage and performs its function by drawing current from the power supply 20 until the voltage drop across the terminal impedance of the supply 20 is such that the output voltage of the supply is equal to the rating of the tube 30 plus any additional voltage such as that across circuit 31. Tube 30 maintains a constant current output from the power supply 20 regardless of the current flow through circuit 23. The nominal voltage of tube 30 is only slightly affected by variations in temperature and the amount of current passing through tube 30. The power supply 20 has a variable output which permits the current flow through tube 30 to be adjusted so as to remain within rated limits over the normal region of operation. Such a tube may be of the 5841 type made by Victoreen Instrument Company or similar tube.

The second circuit includes, in series with the tube 30, a measuring and indicating circuit indicated at 31, which includes a meter 32 and an integrator network indicated generally at 34. The network 34 is serially connected between meter 32 and the other output lead 28 of source 20 or ground. The integrator 34 comprises a resistor 36 and a capacitor 38 in parallel with resistor 36.

At steady state and in the absence of any radiation impinging upon detector 26 the power supply 20 furnishes a steady current $I_0$. Since there is no ionization within the detector 26, other than that due to background effects, essentially no current flows through the detector circuit 23 and the full current, $I_0$, flows through the second circuit 27 and meter 32. That point on the meter scale which is indicated under these conditions would correspond to zero radiation intensity and the zero adjustment is made by adjusting the output of power supply 20.

When the detector 26 is subjected to radiation from some source, a fraction of the current $I_0$, denoted by $\alpha$, would flow through resistor 24 and detector 26. The balance of the current $(1-\alpha)I_0$ would then flow through measuring and indicating circuit 31 and meter 32 giving an indication reduced by factor $(1-\alpha)$. The meter 32 is calibrated for different intensities of radiation incident on the detector 26. The resistor 36 and capacitor 38 of the integrator 34 act to smooth the current flow through meter 32 which would otherwise fluctuate because of statistical variations in radioactivity from source 40 and ionization in detector 26. The series resistor 24 may be variable so that changes in sensitivity of the circuit to radiation may be compensated for or to provide different ranges of sensitivity.

In this circuit no actual counting of pulses takes place and measurement indication of radiation is accomplished by detecting the average current flow through the measuring and indicating circuit 31 where that average current flow varies in response to the amount of radiation impinging upon detector 26 and the resultant current flow in the detector circuit 23. Thus, if source 40 is positioned a predetermined distance from the detector 26 and a zero reading adjustment is made at this time, the introduction of an absorber between source 40 and detector 26 will result in a change in the reading of meter 32. This change will depend upon the mass per unit area of the absorber, i.e., thickness. In this manner the meter may be calibrated by the use of known thickness specimens to read directly in the thickness of the material placed between or passed between source 40 and detector 26. Thus, a simplified thickness measuring instrument utilizing the circuit of FIG. 1 could readily be made.

Typical values and types of components which may be utilized in the circuit of FIG. 1 are shown in Table 1.

Table 1

| Element: | Value and/or type |
|---|---|
| 24 | 1 megohm. |
| 26 | Lionel GM Tube, Type 1001T. |
| 30 | Victoreen Corotron, Type 5841. |
| 36 | 100K ohms. |
| 38 | 20 $\mu f$. |

In the embodiment of FIG. 1 the amplifier electrical network comprises a power source, a pair of circuits one of which contains a radiation detector 26 and the other of which contains a voltage regulator 30 plus a serially connected means for measuring and indicating the current flow through the one circuit which current is a function of the incident radiation on the detector 20. In this embodiment the serially connected measuring and indicating means includes an integrator and a meter, the latter indicates directly the current flow and is calibrated in a predetermined manner.

The second embodiment of the present invention is similar to the first except that the above mentioned serially connected means includes a bridge circuit indicated generally as 31 which materially enhances the accuracy of measurement and provides a means for self-compensation for drift. Specifically the embodiment of FIG. 2 includes a power supply 20 having an output lead 22 connected to the input of first and second circuits 23 and 27. The first circuit 23 includes a resistor 24 serially connected with a radiation detector 26. The second circuit 27 includes a voltage regulator tube 30 as previously described, serially connected with measuring and indicating circuit 31. The measuring and indicating circuit is connected to the output of the first circuit 23 and to the second output lead 28 of the power source 30. In the embodiment the measuring and indicating circuit 31 employs a bridge circuit and a potentiometer 42 to obtain a meaningful meter indication. The bridge circuit consists of four resistors 44, 45, 46 and 47 connected in the standard bridge arrangement where the resistors 44 and 45 are in parallel circuit with resistors 46 and 47 and where the bridge is serially connected between the tube 30 and the lead 28. One arm of the bridge contains a potentiometer 42 equipped with a precision graduated dial so that the position of the slider may be accurately determined. The output of detector circuit 23 is connected to the end of the potentiometer 42 adjacent to resistor 46. The slider 48 of the potentiometer 42 is connected through null indicating meter 50 to the junction of resistors 44 and 45. A capacitor 52 is connected in parallel with the meter 50 to minimize current fluctuations.

The ratio of the sum of the resistance values of the fixed resistor 47 and the potentiometer 42, to the resistance value of 45 will be the same as the ratio of resistance value of 46 to the resistance value of 44. For the purposes of illustration, it is assumed that the value of 45 equals the sum of the values of resistors 42 and 47. The quantity "$f$" shown in FIG. 2 is the fraction of the total resistance between points 54 and 56 which occurs between point 54 and slider 48.

Figure 2:
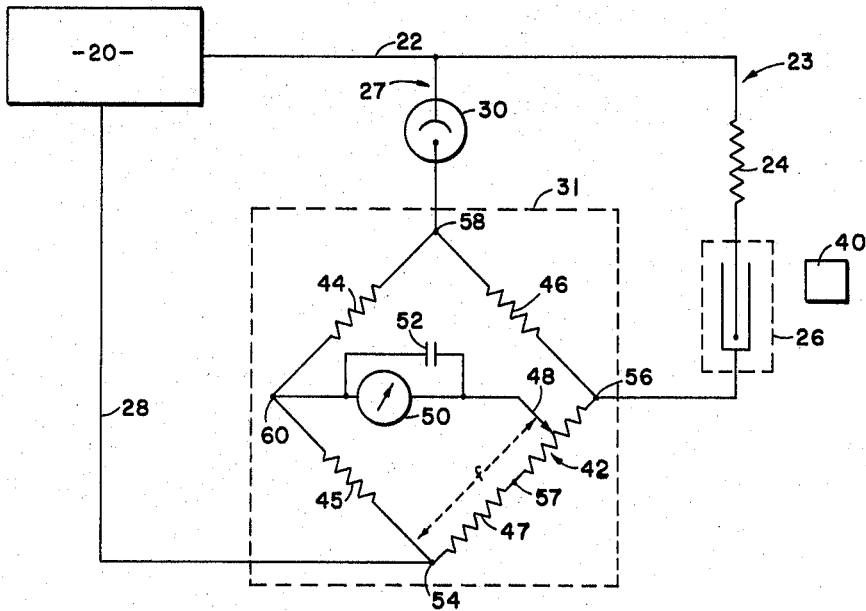
FIG. 2 is a circuit diagram of another embodiment of the present invention.

Typical values and types of components which may be utilized in the circuit of FIG. 2, which differ from those used in FIG. 1, are shown in Table 2.

*Table 2*

| Element: | Value and/or type |
|---|---|
| 42 | 300K ohms. |
| 44 | 1 megohm. |
| 45 | 400K ohms. |
| 46 | 1 megohm. |
| 47 | 100K ohms. |
| 52 | 30 µf. |

Utilizing the circuit as a nuclear gage, i.e., thickness gage, the zero condition is obtained with a standard absorber interposed between the source 40 and detector 26. With the standard absorber positioned the output of the power supply 20 or the value of resistance 24 may be varied to obtain a null condition on meter 50 with the slider 48 located at the position 57. At the zero condition a substantial fraction, $\alpha(0)$, of the total current output of supply 20, $I_0$, will flow through the detector 26, entering the measuring and indicating means 31 at the point 56; while the balance of the current, $(1-\alpha(0))\, I_0$, will flow through tube 30 and enter the measuring and indicating means at point 58. With proper selection of resistance values and adjustment of power supply output, the voltages at points 60 and 57 will be equal and meter 50 will indicate a null condition.

Having achieved a zero adjustment, a calibration curve may be obtained by interposing various absorbers of known characteristics between the source 40 and detector 26. As each absorber of increasing thickness is placed in position, the quantity of radiation reaching the detector 26 will be reduced. This will reduce the current flow through the detector 26 and correspondingly increase the current flow through tube 30, with a resultant unbalance of the bridge as indicated by the null meter. In each instance, balance may be restored by moving the slider 48 away from position 57 toward position 56. By noting the slider dial position required to reattain a null indication for each absorber of known characteristics, a calibration curve may be plotted in terms of thickness, for example. The circuit may then be used to establish the mass/unit area or thickness of unknown absorbers by comparing the dial position of slider 48 required for balance with the calibrated curve.

In the embodiment of FIG. 2 it will be noted that any changes in the output current of power supply 20 will divide at point 58, will appear at both point 60 and 48, and the resulting voltages will therefore tend to cancel each other to a degree which depends on the proximity of the balance position of the potentiometer slider 48 to point 56. Thus, over the useful range of operation the circuit self-compensates for drift to a large extent and accuracies of ±2 percent or better can be easily attained in the measurement of material thicknesses.

The present invention is not limited to the specific details of the particular embodiments described, since many modifications will be apparent to those skilled in the art, the scope of the present invention being limited only by the appended claims.

I claim:

1. An electrical network comprising a source of high voltage having a pair of output terminals; a first circuit consisting of a resistor and a radiation detector in series with said resistor, and an input and output, said detector being adapted to allow current to flow through said first circuit in response to impinging radiation, the input of said first circuit being connected to one of said terminals; a second circuit including a voltage regulator tube of the corona discharge type for maintaining a constant voltage output from said source and means for measuring and indicating the current flow through one of said circuits, said last named means and said tube being serially connected and having said tube connected to said one terminal and said measuring means connected to the other terminal; the output of said first circuit being connected to said means for measuring and indicating the current flow.

2. An electrical network of claim 1 wherein said means for measuring and indicating includes a meter and integrating means, said integrating means being serially connected between said output of said first circuit and said meter.

3. An electrical network of claim 1 wherein said means for measuring and indicating includes an electrical bridge circuit having a potentiometer in one leg, fixed resistors in the other legs and null balance indicator means, and wherein said voltage regulating tube and said other terminal are connected to diagonally opposed junctions of said bridge.

(References on following page)

References Cited by the Examiner

UNITED STATES PATENTS

| | | | |
|---|---|---|---|
| 2,304,191 | 12/1942 | Mott-Smith | 250—210 |
| 2,833,932 | 5/1958 | Constable | 250—83.6 |
| 2,839,688 | 6/1958 | Anton | 250—83.6 |
| 2,876,360 | 3/1959 | Victoreen | 250—83 |
| 2,919,351 | 12/1959 | Swift | 250—83.6 |
| 2,947,935 | 8/1960 | Sepmeyer | 323—75 |
| 2,960,646 | 11/1960 | Malsbury | 323—75 |
| 3,056,123 | 9/1962 | Shamos | 250—83 |

RALPH G. NILSON, *Primary Examiner.*

J. W. LAWRENCE, *Assistant Examiner.*